Aug. 25, 1959     T. C. KANE     2,901,184
JET RINGS
Filed Nov. 30, 1956     2 Sheets-Sheet 1
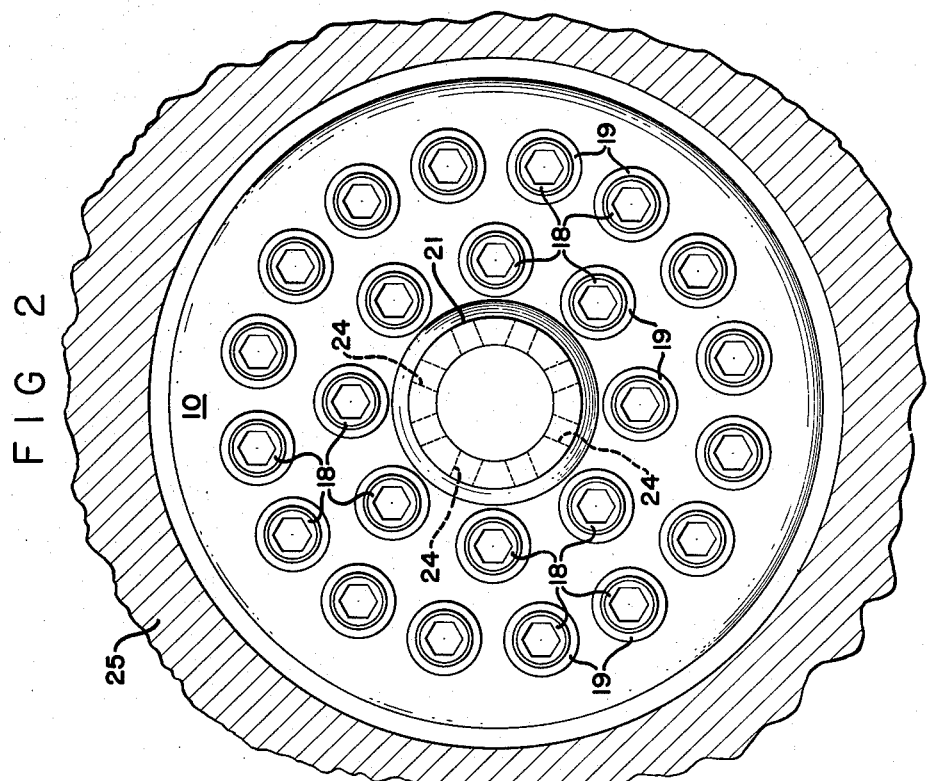
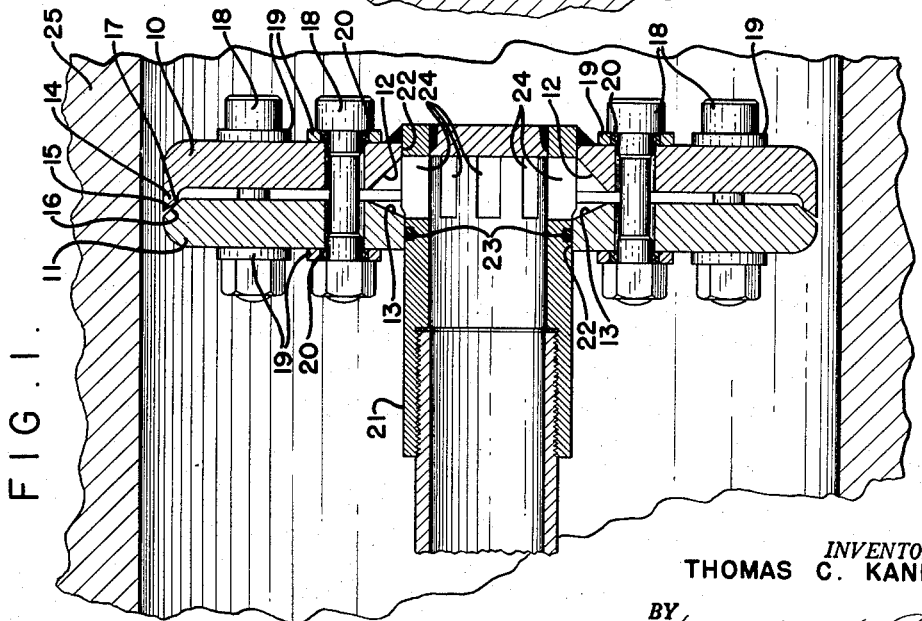
INVENTOR.
THOMAS C. KANE Aug. 25, 1959

T. C. KANE 2,901,184

JET RINGS

Filed Nov. 30, 1956

INVENTOR.
THOMAS C. KANE

United States Patent Office 2,901,184
Patented Aug. 25, 1959

2,901,184

JET RINGS

Thomas C. Kane, Mahoning County, Ohio, assignor to The Commercial Shearing and Stamping Company, Youngstown, Ohio, a corporation of Ohio Application November 30, 1956, Serial No. 625,304

3 Claims. (Cl. 239—452)

This invention relates to jet rings and particularly to a jet ring for delivering a high pressure film of liquid outwardly from the axis of a circle to form an annular sheet of liquid. This application is a continuation-in-part of my copending application Serial No. 471,679 filed November 19, 1954 now Patent 2,785,924.

There are many industrial applications which require the application of a high pressure spray of liquid in a sheet outwardly from the center of a circle. For example, in the descaling of the interiors of pipe and tubing and similar regular hollow bodies, it is desirable to apply a thin, uniform spray of cold water onto the internal surface of the heated tube to break up the scale and wash it from the interior of the tube. No satisfactory and economical mechanism for accomplishing this purpose has been heretofore available.

I have invented a jet ring which makes possible the application of a thin, uniform sheet of high pressure liquid against the internal surface of a hollow object. I shall describe my invention as particularly applied to the internal descaling of a heated ferrous tube.

I provide a jet ring having a pair of annular members, a chamber between said members, line contact between said members along the exterenal periphery of the members at one side of the chamber, holding means spaced on the side of the chamber opposite the line contact holding said annular members resiliently together and means for introducing a liquid at high pressure into the chamber between the members whereby the annular members are caused to flex apart about their outer periphery under pressure to form an annular nozzle. Preferably, the means introducing liquid at high pressure into the chamber is an axially extending pipe supporting the annular members.

I have generally stated certain objects, advantages and purposes of this invention. However, other advantages, objects and purposes will be apparent from a consideration of the following description and the accompanying drawings in which:

Figure 1 is a longitudinal section of a preferred embodiment of my invention;

Figure 2 is an end elevation of the jet ring shown in Figure 1;

Figure 3:
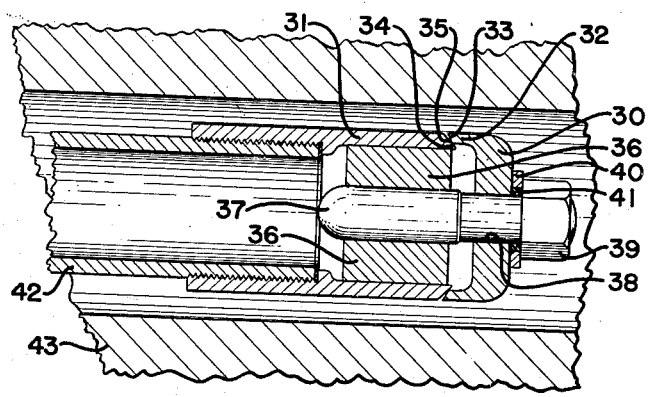
Figure 3 is a longitudinal section of a second embodiment of my invention.

Referring to the drawings, I have illustrated in Figures 1 and 2 a jet ring made up of two annular members 10 and 11. Each of these members is provided with annular mating grooves 12 and 13 forming a chamber between the annular members. One of the members 10 is provided with an annular flange 14 extending axially in the direction of the other member 11. The flange 14 is provided with a tapered face 15 which forms a V-shaped ridge with the edge of the flange. The other member 11 is provided with a sloping face 16 having a greater degree of slope than the face 15 and contacting the face 15 along one edge to form a line contact 17. The two faces 15 and 16 form a directing nozzle for a film of water passing through the line contact 17 as will be more fully described hereafter. The annular members 10 and 11 are held together by bolts 18 and washers 19 carrying rubber sealing rings 20 beneath them so as to form a seal around the bolt ends and to give resilience to the structure. An inlet pipe 21 is fitted in an annular opening 22 in the two rings 10 and 11. The inlet pipe 21 is preferably welded at its end to the member 10 and is in sealing contact with the member 11 through a rubber O-ring 23. Liquid passage 24 is provided in the side wall of the inlet pipe 21 communicating with the chamber formed by the grooves 12 and 13 between the two members 10 and 11.

In operation, a pipe or hollow billet 25 whose interior is to be descaled is passed over the annular rings 10 and 11. High pressure liquid is brought in through inlet pipe 21 to the chamber formed by grooves 12 and 13 through the passage 24. As the pressure builds up in the chamber, the two members distort slightly along the line contact between the faces 15 and 16 permitting a thin sheet of water to jet outwardly around the periphery of the members generally radially from the axis of the members and then impinge upon the internal wall of the pipe or hollow billet being descaled. The amount of the distortion and the pressure required to originate a spray may be regulated by the thickness of the flange 14 and the tightness of the bolts 18.

Figure 4:
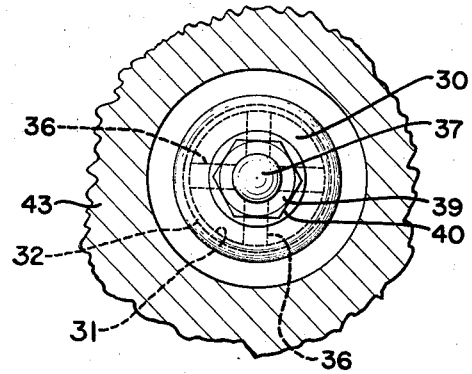
Figure 4 is an end elevation of the jet ring shown in Figure 3.

In Figures 3 and 4 I have illustrated a second embodiment of my invention having a pair of annular members 30 and 31. Annular member 30 is provided with flange 32 extending parallel to the axis of the members from the outer periphery of the member 30. The flange 32 is provided with a sloping face 33. The other member 31 is provided with a sloping face 34 having a greater degree of slope than the face 33 and contacting the face 33 along one edge to form a line contact 35. The two faces form a directing face for a film of water passing through the line contact 35. Spaced radial inwardly extending arms 36 are welded to the interior of the member 31 to carry a fastening bolt 37. The bolt 37 passes through an opening 38 in the center of member 30 and is provided with a fastening nut 39, washer 40 and sealing ring 41. An inlet pipe 42 is fixed to the interior of the member 31 to deliver fluid to the interior thereof.

In operation a pipe or hollow billet 43 is passed over the annular members 30 and 31. High pressure liquid is introduced into the interior of members 30 and 31 through inlet pipe 42. As the pressure builds up in the interior of the members, the two members distort slightly along the line contact 35 between faces 33 and 34 permitting a thin film or sheet of water to jet outwardly around the periphery of the members generally radially therefrom and to impinge upon the internal wall of the pipe or hollow billet being descaled. The amount of distortion and the pressure required to originate a spray may be regulated by the thickness of flange 32 and the tightness of the nut 39 on bolt 37.

While I have illustrated a preferred embodiment of my invention, it will be understood that it might be otherwise embodied within the scope of the following claims:

I claim:

1. A jet ring for delivering a high pressure circular film of liquid outwardly from a central point at an angle less than normal to the axis of the ring comprising a pair of axially aligned side by side circular members, an axially extending flange on one of said members, having inner and outer peripheral faces, a sloping face on said flange facing toward the axis of the circular members and forming a V-shaped ridge with the inner face of the flange, an angularly outwardly extending face on the other member, said face forming a line contact with the edge of the V-shaped ridge on the flange, to form a chamber beneath the flange between the circular members, holding means spaced radially inwardly from the line contact holding said annular members resiliently together and means connected to said chamber for introducing a high pressure liquid into the chamber between the annular members whereby the annular members are caused to flex along the line of contact to form an outwardly directed circular nozzle.

2. A jet ring for delivering a high pressure circular film of liquid outwardly from a central point at an angle less than normal to the axis of the ring comprising a pair of axially aligned side by side circular members, an axially extending flange on one of said members, having inner and outer peripheral faces, a sloping face on said flange facing toward the axis of the circular members and forming a V-shaped ridge with the inner face of the flange, an angularly outwardly extending face on the other member, said face forming a line contact with the edge of the V-shaped ridge on the flange, to form a chamber beneath the flange between the circular members, spaced bolts passing through the annular members and spaced radially inwardly from the line contact holding said annular members resiliently together and means connected to said chamber for introducing a high pressure liquid into the chamber between the annular members whereby the annular members are caused to flex along the line contact to form an outwardly directed nozzle.

3. A jet ring for delivering a high pressure circular film of liquid outwardly from a central point at an angle less than normal to the axis of the ring comprising a pair of axially aligned side by side circular members, one of said members having an annular recess therein, a first truncated conical surface on said one member extending from its outer periphery inwardly to the recess to form a surface facing the axis of the annular recess, a second truncated conical surface of greater slope on the periphery of the other member in line contact with the first conical surface and forming a closed chamber within the recess between said members, holding means spaced radially inwardly from the line contact holding said circular members resiliently together, and means connected to said chamber for introducing a liquid at high pressure into the chamber between the members whereby the circular members are caused to flex apart along the line contact under pressure to form an outwardly directed circular nozzle.

References Cited in the file of this patent
UNITED STATES PATENTS

| | | |
|---|---|---|
| 1,996,159 | Kithredge | Apr. 2, 1935 |
| 2,270,838 | Langdon | Jan. 20, 1942 |
| 2,785,924 | Kane | Mar. 19, 1957 |

FOREIGN PATENTS

| | | |
|---|---|---|
| 157,428 | Great Britain | May 10, 1922 |
| 832,973 | France | July 11, 1938 |